United States Patent
Lee et al.

(10) Patent No.: US 12,449,236 B2
(45) Date of Patent: Oct. 21, 2025

(54) MULTIPURPOSE BULLETPROOF PADS WITH NON-FLAMMABLE PROPERTY

(71) Applicant: SEOHAN ANTAMINE CO., LTD., Incheon (KR)

(72) Inventors: Hyung Seok Lee, Incheon (KR); Hun Tae Kim, Incheon (KR); Hye Young Kim, Incheon (KR)

(73) Assignee: SEOHAN ANTAMINE CO., LTD., Incheon (KR)

( * ) Notice: Subject to any disclaimer, the term of this patent is extended or adjusted under 35 U.S.C. 154(b) by 0 days.

(21) Appl. No.: 18/603,258

(22) Filed: Mar. 13, 2024

(65) Prior Publication Data

US 2024/0219151 A1   Jul. 4, 2024

Related U.S. Application Data

(63) Continuation of application No. PCT/KR2022/016349, filed on Oct. 25, 2022.

(51) Int. Cl.
*F41H 5/04* (2006.01)
*B32B 5/02* (2006.01)
(Continued)

(52) U.S. Cl.
CPC ........... *F41H 5/0478* (2013.01); *B32B 5/024* (2013.01); *B32B 27/10* (2013.01); *B32B 27/12* (2013.01);
(Continued)

(58) Field of Classification Search
CPC ..... F41H 5/0471; F41H 5/0478; B32B 5/024; B32B 27/08; B32B 27/10; B32B 27/308;
(Continued)

(56) References Cited

U.S. PATENT DOCUMENTS 4,020,207 A * 4/1977 Alfter ................. B60R 13/0225
428/116
2005/0266221 A1* 12/2005 Karam .................... B32B 27/04
428/292.1
(Continued)

FOREIGN PATENT DOCUMENTS

KR  10-2010-0128456 A  12/2010
KR  10-1118133 B1  3/2012
(Continued)

Primary Examiner — Benjamin P Lee
(74) Attorney, Agent, or Firm — NKL LAW; Jae Youn Kim

(57) ABSTRACT

Provided are a core material (10) formed in a structure in which a fiber glass (10A) and an aramid (10B) are woven and stacked; an outer cover member (20) formed by attaching high-density polyethylene (20A) and impregnated kraft paper (20B) to an outside of the core material (10); and a non-flammable member (30) formed by attaching an acrylic resin (30A) and a ceramic coating material (30B) to at least one surface of the outer cover member (20). Therefore, it is possible to prevent deterioration of bulletproof power due to detachment and breakage caused by bullets in the event of a gun accident, and to enhance non-flammability and eco-friendliness to expand the internal and external fields of a building, thereby enhancing product competitiveness and increasing usability.

5 Claims, 3 Drawing Sheets

(51) Int. Cl.
  *B32B 27/10* (2006.01)
  *B32B 27/12* (2006.01)
  *B32B 27/30* (2006.01)
  *B32B 27/32* (2006.01)
  *C09J 9/00* (2006.01)
  *C09J 11/06* (2006.01)
  *C09J 133/04* (2006.01)

(52) U.S. Cl.
  CPC ............ *B32B 27/308* (2013.01); *B32B 27/32* (2013.01); *C09J 9/00* (2013.01); *C09J 11/06* (2013.01); *C09J 133/04* (2013.01); *B32B 2250/05* (2013.01); *B32B 2255/10* (2013.01); *B32B 2255/20* (2013.01); *B32B 2260/023* (2013.01); *B32B 2260/028* (2013.01); *B32B 2260/046* (2013.01); *B32B 2262/0269* (2013.01); *B32B 2262/101* (2013.01); *B32B 2262/148* (2021.05); *B32B 2264/10* (2013.01); *B32B 2307/3065* (2013.01); *B32B 2571/02* (2013.01)

(58) Field of Classification Search
  CPC .............. B32B 27/32; B32B 2262/148; B32B 2250/05; B32B 2255/10; B32B 2255/20; B32B 2260/023; B32B 2260/028; B32B 2260/046; B32B 2262/0269; B32B 2262/101; B32B 2264/10; B32B 2571/02; C09J 9/00
  See application file for complete search history.

(56) References Cited

U.S. PATENT DOCUMENTS

| | | | |
|---|---|---|---|
| 2009/0113831 A1* | 5/2009 | DeWildt | ................... B32B 5/20 52/309.4 |
| 2017/0314894 A1* | 11/2017 | Tunis, III | .................. B32B 5/26 |
| 2018/0162107 A1* | 6/2018 | Xu | ........................ B32B 27/286 |
| 2023/0295924 A1* | 9/2023 | Bao | .......................... B32B 5/022 |
| 2024/0302139 A1* | 9/2024 | Merletti | .................. B32B 5/022 |

FOREIGN PATENT DOCUMENTS

| | | |
|---|---|---|
| KR | 10-2017-0086715 A | 7/2017 |
| KR | 10-2018-0053082 A | 5/2018 |
| KR | 10-2019-0099825 A | 8/2019 |
| KR | 10-2020-0065204 A | 6/2020 |
| KR | 10-2241245 B1 | 4/2021 |

* cited by examiner

MULTIPURPOSE BULLETPROOF PADS WITH NON-FLAMMABLE PROPERTY

TECHNICAL FIELD

The present invention relates to a multipurpose bulletproof pad, and more specifically, to a multipurpose bulletproof pad with a non-flammable property for use in environments with a high risk of a gun accident.

BACKGROUND ART

In the United States and Europe, the bulletproof material market is expanding due to strengthening of laws and regulations due to frequent gun accidents, and bulletproof helmet and vest products based on bulletproof materials are being developed to be applied to many places from military supplies to general use facilities.

On the other hand, in Korea, research on bulletproof materials is concentrated in the military industry, and the development of technologies applied to interior/exterior boards and bags of buildings is being made at all or is very insufficient. Currently, bulletproof materials using carbon fibers developed for military use are not expensive products and non-combustible, and are not suitable for specific applications because toxic gases are generated in the event of a fire.

In this regard, reference may be made to prior technical documents such as Korean Registered Patent No. 1118133 and Korean Registered Patent No. 2241245.

The former comprises: a ceramic plate; bulletproof fabric treated with a shear thickening fluid, which is laminated on a rear surface of the ceramic plate; a sealing film sealing the treated bulletproof fabric while sealing the same; and a front bulletproof fabric laminated on a front surface of the ceramic plate. Accordingly, it is expected to have an effect of improving a bulletproof performance, reducing weight, and minimizing deformation on the rear surface.

The latter comprises: a base layer formed of polymethyl methacrylate; reinforcing layers formed on both surfaces of the base layer; and an adhesive layer formed between the base layer and the reinforcing layer and formed of an ultraviolet-curable urethane resin having a thickness of 1 to 3 mm. Accordingly, it is expected to have excellent bulletproof properties and an effect of blocking debris from scattering.

However, as described above, since it is insufficient to be expanded and applied to the same fields as the interior/exterior boards of buildings, there is still a lot of room for improvement.

PRIOR ART DOCUMENTS (Patent Document 1) Korean Registered Patent No. 1118133 "CERAMIC BULLETPROOF PANEL FOR BULLETPROOF VEST AND MANUFACTURING METHOD THEREOF" (publication date: Aug. 10, 2011)
(Patent Document 2) Korean Registered Patent No. 2241245 "BULLETPROOF PANEL" (publication date: Sep. 16, 2020)

DISCLOSURE

Technical Problem

To solve the conventional problems as described above, an object of the present invention is to provide a multipurpose bulletproof pad with a non-flammable property, which may prevent deterioration of a bulletproof force due to peeling or breakage caused by bullets based on a structure used in an environment having a high risk of a gun accident, and may enhance a non-flammable property and eco-friendliness to expand the fields such as an internal/external board of a building.

Technical Solution

To achieve the above object, the present invention includes: a core material formed in a stack structure by weaving a fiber glass and an aramid; an outer cover member formed by attaching high-density polyethylene and impregnated kraft paper to an outer portion of the core material; and a non-flammable member formed by attaching an acrylic resin and a ceramic coating material to at least one surface of the outer cover member.

As a detailed configuration of the present invention, the core material may be formed by impregnating the core material in a liquid-phase thermosetting resin and drying the core material.

As a detailed configuration of the present invention, the outer cover member may be attached using an adhesive obtained by mixing a tackifier or a cyclohexane-based resin with a polyurethane base.

As a detailed configuration of the present invention, the non-flammable member may further include an inorganic flame retardant selected from magnesium oxide, zinc oxide, titanium oxide, magnesium hydroxide, calcium carbonate, silicon dioxide, and aluminum hydroxide.

According to a modification example of the present invention, the outer cover member may further include a UV film or a finishing material provided on at least one surface thereof, and the core material may further include an auxiliary material for supplementing or improving physical properties.

Advantageous Effects

According to the present invention, it is possible to prevent deterioration of bulletproof power due to delamination and breakage caused by bullets during a gun accident, and to enhance a non-flammable property and eco-friendliness to expand the internal/external fields of a building, thereby enhancing product competitiveness and increasing usability.

MODE FOR INVENTION

Hereinafter, an embodiment of the present invention will be described in detail with reference to accompanying drawings.

The present invention proposes multipurpose a bulletproof pad with a non-flammable property. The bulletproof pad may be applied to finished products such as interior/exterior materials of a building and various bags in addition to bulletproof clothing. The non-flammable property is defined as including not only semi-nonflammable property but also flame retardancy.

Figure 1:
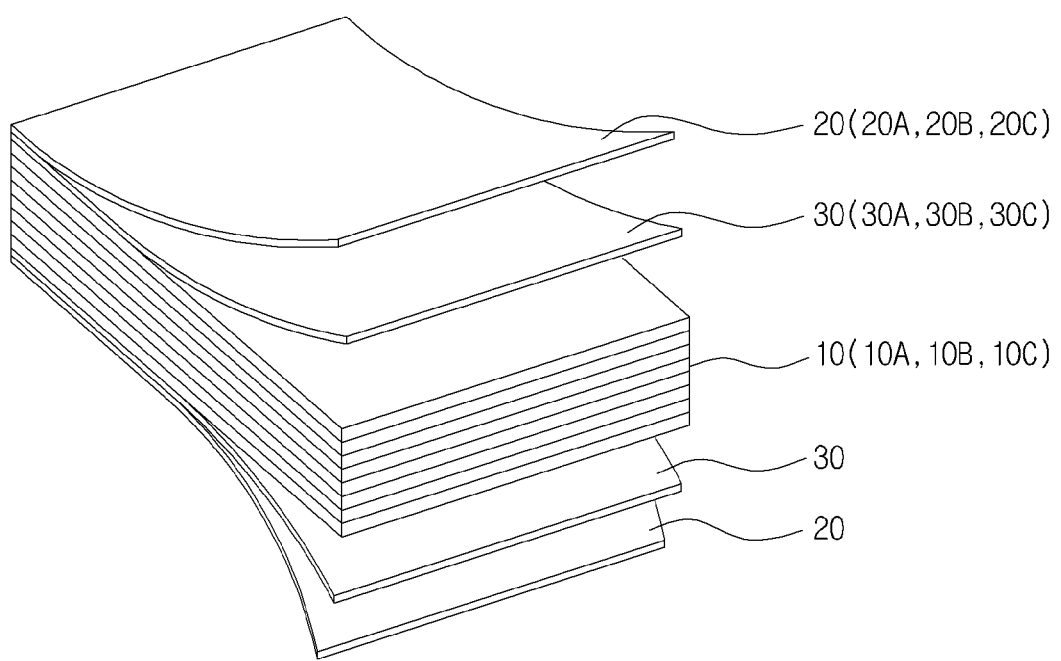
FIG. 1 is a schematic view showing a main part of a bulletproof pad according to the present invention.

Referring to FIG. 1, the bullet pad of the present invention includes a core material 10, an outer cover member 20, and a non-flammable member 30. The bulletproof materials formed of carbon fibers are expensive products and not non-flammable, resulting in generation of toxic gas in the event of a fire, so that it is not suitable for a specific purpose including a building.

The core material 10 according to the present invention has a stack structure by weaving a fiber glass 10A and an aramid 10B.

The core material 10 is based on a fabric woven by alternately disposing filaments of the fiber glass 10A and filaments of the aramid 10B. The woven fabric may be selectively applied from plain weave, double weave, and leno weave. However, tissues such as baskets are excluded because the tissues have low impregnating properties and cause breakage due to bullets. Since the core material 10 has a structure in which a plurality of fabrics are stacked, two or more types of tissues may be mixed.

As a detailed configuration of the present invention, the core material 10 is formed by impregnating the core material 10 in a liquid-phase thermosetting resin 10C and drying the core material 10.

As the thermosetting resin 10C of the core material 10, a melamine resin, an epoxy resin, a polyester resin, a phenol resin, or the like may be selectively used. An appropriate amount of the thermosetting resin may be mixed depending on physical properties of a finished product. A vacuum pressure may be used to enhance impregnating properties. In this case, the core material 10 is added to a vacuum chamber and air is removed from the vacuum chamber, and then a melted thermosetting resin 10C is supplied to induce impregnation using the vacuum pressure. The vacuum pressure is differentially applied in response to the tissue of the fabric. In any case, the uniform impregnation is induced to the fabric, and then the fabric is dried at a uniform temperature.

Meanwhile, the fabric of the core material 10 may partially apply a 3D tissue including warp, filling, and Z-yarn. In this case, when the fabric is vacuum-impregnated and dried, an impregnation solution uniformly penetrates into the tissue, thereby increasing bulletproof performance.

The outer cover member 20 according to the present invention is formed by attaching high-density polyethylene 20A and impregnated kraft paper 20B to an outer portion of the core material 10.

The outer cover member 20 has cushion paper formed of the high-density polyethylene 20A and the impregnated kraft paper 20B, and is attached to at least one surface of the core material 10. The high-density polyethylene 20A includes a phthalic acid ester plasticizer, a trimellitic acid ester plasticizer, and the like, to increase flexibility and elasticity. The impregnated kraft paper 20B may be used by impregnating the impregnated kraft paper 20B in a melamine resin or a phenol resin so as to increase flame retardancy. The high-density polyethylene 20A and the impregnated kraft paper 20B are heat-pressed at a pressure of 50 kgf/cm$^2$ to 80 kgf/cm$^2$ at a temperature of 120° C. to 180° C. for 50 minutes to 80 minutes to generate the outer cover member 20.

As a detailed configuration of the present invention, the outer cover member 20 is attached using an adhesive 20C obtained by mixing a tackifier or a cyclohexane-based resin with a polyurethane base.

The polyurethane resin serving as a base of the adhesive 20C contains a solid content in addition to silicon, which is suitable in terms of adhesive strength and processability. The polyurethane resin may include an ultraviolet curing component. The tackifier may be selected from a rosin resin, a terpene resin, and a hydrocarbon resin. Similar physical properties are exhibited even when the cyclohexane-based resin is mixed in place of or together with the tackifier. In any case, the interface adhesion of the outer cover member 20 is improved to meet physical property conditions such as compressive strength, shear strength, and dimensional change rate, and to prevent delamination due to bullets.

The non-flammable member 30 according to the present invention is formed by attaching an acrylic resin 30A and a ceramic coating material 30B to at least one surface of the outer cover member 20.

The non-flammable member 30 is formed of the acrylic resin 30A and the ceramic coating material 30B as a base material, and is interposed either between the core material 10 and the outer cover member 20 or between the core material 10 and an outside of the outer cover member 20. The acrylic resin 30A includes an amino group-containing phosphoric acid ester flame retardant having both a phosphate and an amine group. A composite material obtained by mixing epoxy, styrene, and vinyl acetate with the acrylic resin 30A may be used. The ceramic coating material 30B is formed by mixing silicon silicate, silicon emulsion, aerosol, and water with ceramic as a main material. In addition, zinc oxide, silicon oxide, sodium silicate, and the like may be further added to the ceramic coating material 30B.

As a detailed configuration of the present invention, the non-flammable member 30 may further include an inorganic flame retardant material 30C selected from magnesium oxide, zinc oxide, titanium oxide, magnesium hydroxide, calcium carbonate, silicon dioxide, and aluminum hydroxide.

The inorganic flame retardant material 30C is preferably a mixture of two or more materials, and has an average particle diameter of 150 to 350 µm. In consideration of non-toxicity harmless to the human body, the contents of magnesium oxide, zinc oxide, titanium oxide, and magnesium hydroxide are increased. In particle size analysis, the particle diameter means a median size corresponding to 50% in accumulation. To increase formability, a particle size is maintained to be high, and to increase a bonding force, the particle size is maintained to be low.

The bulletproof pad having the above-described configuration is light, easy to process, easy to carry, and applicable to all types of buildings, thereby having utility for multiple purposes.

As a modification example of the present invention, the outer cover member 20 further includes a UV film 42 or a finishing material 44 provided on at least one surface thereof, and the core material 10 further includes an auxiliary material 46 for supplementing or improving physical properties.

Figure 2:
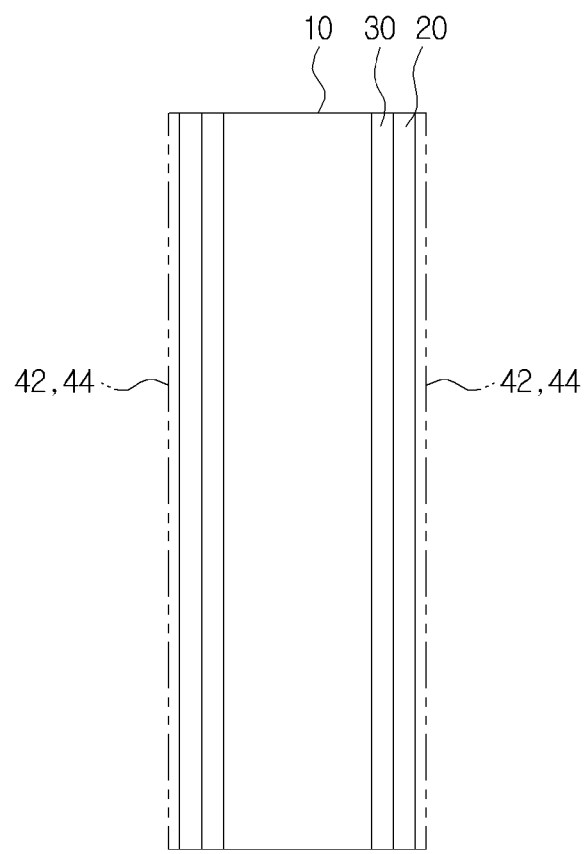
FIG. 2 is a schematic view showing a modification example of the bulletproof pad according to the present invention.
Figure 3:
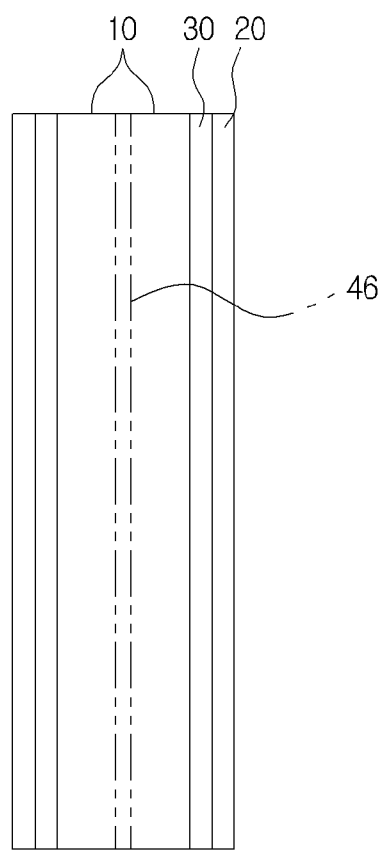
FIG. 3 is a schematic view showing a modification example of the bulletproof pad according to the present invention.

Referring to FIGS. 2 and 3, the bulletproof pad according to the present invention may be provided with an auxiliary member in response to the possibility of deterioration due to sunlight or the like, a risk factor of expansion/contraction properties according to a temperature, the possibility of deformation of wood, or the like, depending on the application field. The auxiliary member is exemplified by the UV film 42, the finishing material 44, and the auxiliary material 46. The UV film 42 prevents damage or scratches due to ultraviolet light. The finishing material 44 is formed of pattern paper and impregnated paper to improve aesthetics of interior/exterior materials of a building. The auxiliary material 46 is applied as a composite material sheet in order to increase flexural strength and flexibility when the bulletproof pad is worn on the body, and is applied as a metal net having high strength when the bulletproof pad is thinned to reduce bulletproof properties.

It will be obvious to those skilled in the art that the present invention is not limited to the described embodiments and may be modified and altered in various manners without departing from the spirit and scope of the present invention. Therefore, such modifications or alienations will be construed as being encompassed by the scope of the attached claims.

| Description of Reference Numerals | | |
|---|---|---|
| 10: core material | | |
| 10A: fiber glass | 10B: aramid | 10C: thermosetting resin |
| 20: outer cover member | | |
| 20A: high-density polyethylene | 20B: impregnated kraft paper | 20C: adhesive |
| 30: non-flammable member | | |
| 30A: acrylic resin | 30B: ceramic coating material | 30C: inorganic retardant |
| 42: UV film | 44: finishing material | 46: auxiliary material |

INDUSTRIAL APPLICABILITY

The bulletproof pad prevents deterioration of bulletproof power due to delamination and breakage caused by bullets in a gun accident, and enhances a non-flammable property and eco-friendliness.

The invention claimed is:

1. A multipurpose bulletproof pad with a non-flammable property, the multipurpose bulletproof pad comprising:
   a core material including a stack structure of a woven fiber glass and an aramid;
   an outer cover member disposed on an outer surface of the core material, wherein the outer core member includes high-density polyethylene and impregnated kraft paper; and
   a non-flammable member disposed on at least one surface of the outer cover member, wherein the non-flammable member includes an acrylic resin and a ceramic coating material.

2. The multipurpose bulletproof pad of claim 1, wherein the core material includes a liquid-phase thermosetting resin impregnated within the woven fiber glass and aramid fibers.

3. The multipurpose bulletproof pad of claim 1, wherein the outer cover member is bonded to the core material with an adhesive comprising a polyurethane base and at least one of a tackifier or a cyclohexane-based resin by mixing a tackifier or a cyclohexane based resin with a polyurethane base.

4. The multipurpose bulletproof pad of claim 1, wherein the non-flammable member further includes an inorganic flame retardant material selected from the group comprising magnesium oxide, zinc oxide, titanium oxide, magnesium hydroxide, calcium carbonate, silicon dioxide, and aluminum hydroxide.

5. The multipurpose bulletproof pad of claim 1, wherein the outer cover member further includes a UV film or a finishing material provided on at least one surface thereof, and
   the core material further includes an auxiliary material for supplementing or improving physical properties.

* * * * *